United States Patent
Kwon et al.

(10) Patent No.: US 7,876,750 B2
(45) Date of Patent: Jan. 25, 2011

(54) DIGITAL BROADCASTING SYSTEM AND DATA PROCESSING METHOD THEREOF

(75) Inventors: Yong-sik Kwon, Seoul (KR); Eui-jun Park, Seoul (KR); Jung-pil Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1229 days.

(21) Appl. No.: 11/416,258

(22) Filed: May 3, 2006

(65) Prior Publication Data

US 2007/0230456 A1 Oct. 4, 2007

Related U.S. Application Data

(60) Provisional application No. 60/788,707, filed on Apr. 4, 2006.

(51) Int. Cl.
*H04L 12/28* (2006.01)
(52) U.S. Cl. .............. 370/389; 370/474; 370/503; 375/240
(58) Field of Classification Search .............. 370/389, 370/503; 386/111, 112, 124
See application file for complete search history.

(56) References Cited

U.S. PATENT DOCUMENTS

| | | | | |
|---|---|---|---|---|
| 6,118,819 | A * | 9/2000 | Kim | 375/240 |
| 6,438,145 | B1 | 8/2002 | Movshovich et al. | |
| 6,643,298 | B1 * | 11/2003 | Brunheroto et al. | 370/537 |
| 6,845,107 | B1 * | 1/2005 | Kitazawa et al. | 370/537 |
| 6,963,612 | B2 | 11/2005 | Haddad | |
| 6,987,739 | B2 * | 1/2006 | Kitazawa et al. | 370/252 |
| 2002/0085632 | A1 | 7/2002 | Choi et al. | |
| 2002/0150123 | A1 * | 10/2002 | Ro | 370/465 |
| 2003/0070172 | A1 * | 4/2003 | Matsuzaki et al. | 725/87 |
| 2004/0233996 | A1 * | 11/2004 | Jung et al. | 375/240.26 |
| 2004/0240668 | A1 * | 12/2004 | Bonan et al. | 380/200 |

(Continued)

FOREIGN PATENT DOCUMENTS

CN 1678068 A 10/2005

(Continued)

OTHER PUBLICATIONS

U.S. Appl. No. 12/263,017, filed Oct. 31, 2008, Yong-sik Kwon et al, Samsung Electronics Co., Ltd.

(Continued)

*Primary Examiner*—Bob A Phunkulh
(74) *Attorney, Agent, or Firm*—Sughrue Mion, PLLC

(57) ABSTRACT

A digital broadcasting system and a data processing method thereof are provided. An apparatus for generating a transport stream includes a packet generator for generating a plurality of packets by compressing video and audio signals; a counter for counting the number of the generated packets and outputting the count result; and an information controller for determining whether the count result of counting reaches a predetermined number of packets, inserting packet start information into the packets according to the count result, and transmitting the packets with the packet start information inserted therein. The packet start information is added to a packet to be transmitted in a transmitter, and the packet start information is extracted from the received packet in a receiver, so that the waste of frequency resources can be reduced.

24 Claims, 5 Drawing Sheets

U.S. PATENT DOCUMENTS

2006/0200852 A1* 9/2006 Simon .................... 725/118
2006/0227872 A1* 10/2006 Mori et al. ............ 375/240.12
2007/0165621 A1* 7/2007 Cheung et al. ............ 370/389

FOREIGN PATENT DOCUMENTS

| KR | 2001-18378 | 3/2001 |
|----|------------|--------|
| KR | 2003-31668 | 4/2003 |

OTHER PUBLICATIONS

International Search Report issued on Jul. 16, 2007, in International Application No. PCT/KR2007/001565.
Written Opinion of the International Searching Authority issued on Jul. 16, 2007, in International Application No. PCT/KR2007/001565.
U.S. Appl. No. 11/416,254, filed May 3, 2006, Jung-pil Yu et al, Samsung Electronics Co., Ltd.
U.S. Appl. No. 11/416,457, filed May 3, 2006, Jung-pil Yu et al, Samsung Electronics Co., Ltd.
U.S. Appl. No. 11/503,970, filed Aug. 15, 2006, Jung-pil Yu et al, Samsung Electronics Co., Ltd.
U.S. Appl. No. 11/504,024, filed Aug. 15, 2006, Jung-pil Yu et al, Samsung Electronics Co., Ltd.
U.S. Appl. No. 11/504,027, filed Aug. 15, 2006, Jung-pil Yu et al, Samsung Electronics Co., Ltd.
U.S. Appl. No. 11/504,029, filed Aug. 15, 2006, Jung-pil Yu et al, Samsung Electronics Co., Ltd.
U.S. Appl. No. 11/504,030, filed Aug. 15, 2006, Jung-pil Yu et al, Samsung Electronics Co., Ltd.
U.S. Appl. No. 11/504,031, filed Aug. 15, 2006, Jung-pil Yu et al, Samsung Electronics Co., Ltd.
U.S. Appl. No. 11/504,038, filed Aug. 15, 2006, Jung-pil Yu et al, Samsung Electronics Co., Ltd.
U.S. Appl. No. 11/504,651, filed Aug. 16, 2006, Jung-pil Yu et al, Samsung Electronics Co., Ltd.
U.S. Appl. No. 11/504,724, filed Aug. 16, 2006, Jung-pil Yu et al, Samsung Electronics Co., Ltd.
U.S. Appl. No. 11/504,725, filed Aug. 16, 2006, Jung-pil Yu et al, Samsung Electronics Co., Ltd.
U.S. Appl. No. 11/504,726, filed Aug. 16, 2006, Jung-pil Yu et al, Samsung Electronics Co., Ltd.
U.S. Appl. No. 11/505,369, filed Aug. 17, 2006, Jung-pil Yu et al, Samsung Electronics Co., Ltd.
U.S. Appl. No. 11/505,894, filed Aug. 18, 2006, Eui-jun Park et al, Samsung Electronics Co., Ltd.
U.S. Appl. No. 11/508,144, filed Aug. 23, 2006, Jung-pil Yu et al, Samsung Electronics Co., Ltd.
U.S. Appl. No. 11/523,716, filed Sep. 20, 2006, Jung-pil Yu et al, Samsung Electronics Co., Ltd.
U.S. Appl. No. 11/692,509, filed Mar. 28, 2007, Hae-joo Jeong et al, Samsung Electronics Co., Ltd.
Korean Office Action issued on Aug. 29, 2007, in Korean Patent Application No. 2006-66552 (in Korean, no English translation).
Chinese Office Communication dated Nov. 27, 2009 issued in counterpart application No. 2007/80010887.

* cited by examiner

DIGITAL BROADCASTING SYSTEM AND DATA PROCESSING METHOD THEREOF

CROSS-REFERENCE TO RELATED APPLICATIONS

This application claims the benefit of U.S. Provisional Application No. 60/788,707 filed on Apr. 4, 2006, in the U.S. Patent and Trademark Office.

BACKGROUND OF THE INVENTION

1. Field of the Invention

The present invention relates to a digital broadcasting system and a data processing method thereof, and more particularly, to a digital broadcasting system and a data processing method which can reduce waste of frequency resources, via efficient transmission and reception of packets.

2. Description of the Related Art

Recently, the type of a television (TV) broadcasting has been rapidly changing over from analog to digital, and satellite broadcasting systems such as Koreasat in Korea, DirecTV in the United States, SKY PerfecTV! in Japan, and others, have already adopted digital television (DTV) systems. In terrestrial broadcasting, ATV (Advanced TV) in the United States, and DVB (Digital Video Broadcasting) in Europe have rapidly propelled the advance of digital TV broadcasting.

FIG. 1 illustrates a typical digital TV broadcasting system and a process of transmitting a TV program from a broadcasting station to a base station. Referring to FIG. 1, a digital TV broadcasting system 100 includes at least a broadcasting station 110 and multiple base stations 120A-120N arranged within different coverage areas. The broadcasting station 110 generates a broadcasting signal in the form of packets by compressing and packetizing video and audio signals obtained through, for example, a camera and a microphone, respectively, using a modulator (not shown), and transmits the broadcasting packets, via a transmission channel (e.g., optical cables or wireless). The respective base stations 120A-120N, which may be located in different parts of the country, are arranged to receive the broadcast signal for processing accordingly. Each base station is typically provided with a transceiver (i.e., a transmitter and a receiver) capable of transmitting and receiving the broadcast signal.

In this case, broadcast packets are sequentially transmitted one by one. A transmitter, which is installed in a respective base station, processes the broadcast packet transmitted from the broadcasting station 110 in the unit of a frame, and transmits the processed broadcast signal to broadcasting receivers, such as TV receivers that belong to a predetermined communication area. Here, the respective base stations 120A-120N have fixed transmission ranges in which broadcast signals can be transmitted, respectively.

Such broadcast packets or frames may be provided in diverse forms. When frames are generated in a transmitter of the respective base station 120A-120N, the transmitter forms the frames by successively accumulating the transmitted broadcast packets. However, if the transmitter is in an "OFF" state, the transmitter cannot receive the broadcast packets, even though the broadcast packets are transmitted from the broadcasting station 110. When the transmitter is turned "ON", frames are formed by accumulating the received broadcast packets. Accordingly, the respective base stations 120A-120N may receive broadcast packets in different orders depending on the "ON/OFF" state of the transmitters, and in this case, the broadcast packets included in one frame may differ for the respective base stations 120A-120N.

As the transmitters of the respective base stations 120A-120N receive the broadcast packets in different orders, the frames formed through the respective base stations 120A-120N are not identical. Accordingly, in an area where the same broadcast signals are received from two or more base stations 120A-120N, interference may occur between the broadcast signals. As a result, the broadcast signal may not be received at a broadcast receiver.

To prevent this type of interference, the respective base stations 120A-120N generally use separate channels, i.e., different frequencies. In the case of using a single frequency, a method of preventing the overlapping of communication ranges of the respective base stations 120A-120N has been used in order to prevent the broadcast signals from being received from two or more base stations 120A-120N. However, in the case where the respective base stations 120A-120N use separate channels, frequency resources can be wasted. In addition, in the case of preventing the overlapping of the communication ranges of the respective base stations, areas where broadcast receivers cannot receive any of the broadcast signals from the respective base stations 120A-120N may occur inevitably.

Accordingly, a new technique is required to prevent waste of frequency resources by making the respective base stations 120A-120N use the same channel and prevent the occurrence of any area where the broadcast signals cannot be received.

SUMMARY OF THE INVENTION

Several aspects and example embodiments of the present invention provide a digital broadcasting system and a data processing method thereof, which can reduce the waste of frequency resources and conform to a user's convenience by transmitting/receiving packets using packet start information.

Additional aspects and/or advantages of the present invention will be set forth in part in the description which follows and, in part, will be obvious from the description, or may be learned by practice of the present invention.

In accordance with an embodiment of the present invention, there is provided an apparatus for generating a transport stream, which comprises a packet generator to generate a plurality of packets; a counter arranged to count the number of packets generated and provide a count value; and a controller arranged to determine whether the count value reaches a predetermined number of packets, to insert packet start information into the packets, and to transmit the packets having the packet start information inserted therein in a transport stream.

In accordance with another aspect of the present invention, there is provided a data processing method for a transport stream generation apparatus, which comprises generating a plurality of packets by compressing video and audio signals; counting the number of packets generated and providing a count value; and determining whether the count value reaches a predetermined number of packets, inserting packet start information into the packets according to the count value, and transmitting the packets having the packet start information inserted therein in a transport stream.

In still another aspect of the present invention, there is provided a digital broadcast transmission apparatus, which comprises a sync setting unit arranged to set a clock synchronization for the transmission of a transport stream in the form of packets; and a frame generator arranged to make a determination of whether packet start information that indicates a start packet of a frame has been inserted into a next packet subsequent to the packet among a plurality of packets received, and generate a frame based on the determination.

In still another aspect of the present invention, there is provided a data processing method for a digital broadcast transmission apparatus, which comprises setting a clock synchronization for the transmission of a transport stream in the form of packets; and arranging to make a determination of whether packet start information that indicates a start packet of a frame has been inserted into a next packet subsequent to the packet among a plurality of packets received, and generating a frame based on the determination.

In still another aspect of the present invention, there is provided a digital broadcasting system, which comprises a multiplexer for generating a plurality of packets by compressing video and audio signals and having information related to the order of the plurality of packets; and a digital broadcast transmitter for receiving the plurality of packets and the information related to the order of the plurality of packets from the multiplexer, and processing the plurality of packets according to the order.

In still another aspect of the present invention, there is provided a data processing method for a digital broadcasting system, which comprises generating a plurality of packets by compressing video and audio signals; generating information related to the order of the plurality of packets; and transmitting the plurality of packets and the information related to the order of the plurality of packets to a transmitter.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
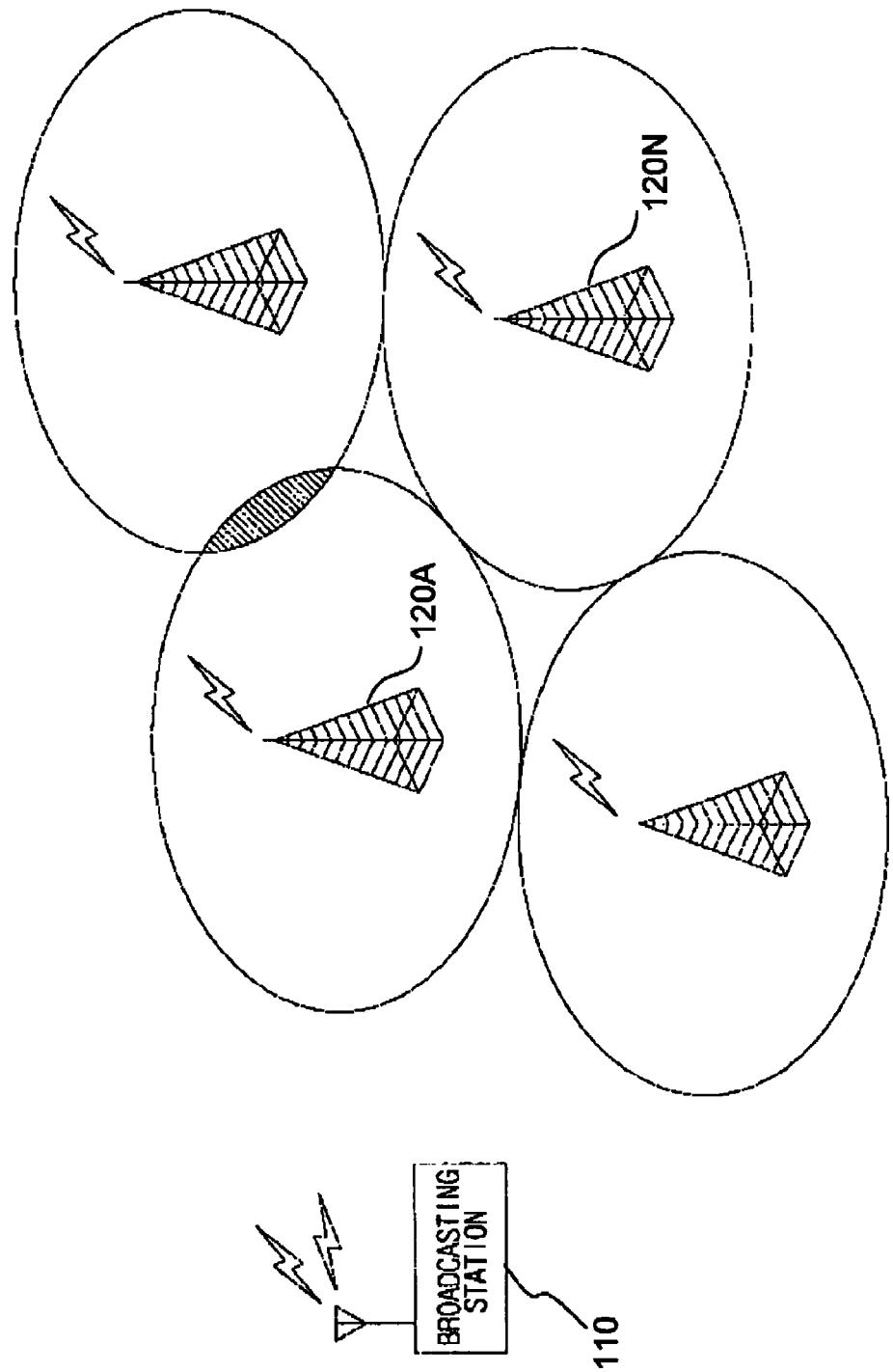
FIG. 1 illustrates a typical digital TV broadcasting system and a process of transferring a TV program from a broadcast station to a base station.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In accordance with a digital broadcasting system according to an embodiment of the present invention, a broadcasting station is provided with a multiplexer to broadcast packets, and base stations are provided with respective transceivers (i.e., transmitters and receivers). When a broadcasting station provided with a multiplexer transmits broadcast packets to respectively base stations provided with transmitters, information about a start packet indicating the start of a frame is shared by the multiplexer and the transmitters, so that the transmitters of the respective base stations form the same frame.

In a terrestrial-wave digital television (DTV) broadcasting system in the U.S., in accordance with an ATSC (Advanced Television Systems Committee) VSB (Vestigial Side Band) standard, a dual transport stream (TS) can be used. Such a dual transport stream (TS) includes a normal stream and a turbo stream.

Figures 2, 3:
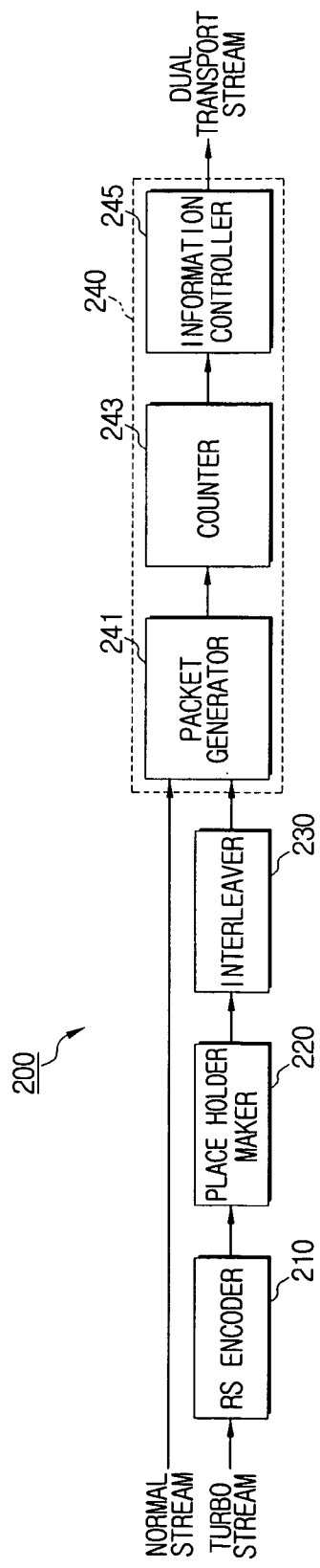
FIG. 2 is a block diagram an example transport stream (TS) construction unit according to an embodiment of the present invention.
FIG. 3 illustrates the structure of an example dual transport stream according to an embodiment of the present invention.

Turning now to FIG. 2, a block diagram of an example transport stream (TS) construction unit for generating a dual transport stream (TS) according to an embodiment of the present invention is illustrated. Referring to FIG. 2, the TS construction unit 200 includes an RS (Reed-Solomon) encoder 210, a place holder maker 220, an interleaver, and a TS multiplexer 240. For purposes of simplicity, the RS encoder 210 and the interleaver 230 can be omitted, and the positions of the RS encoder 210 and the interleaver 230 can be changed.

At the TS construction unit 200, a normal stream and a turbo stream are received. In this case, the normal stream is directly input to the TS multiplexer, and the turbo stream is input to the TS multiplexer 240 through the RS encoder 210, the place holder maker 220, and the interleaver 230. The RS encoder adds a parity to the turbo stream, and the place holder maker 220 generates a parity insertion region for inserting the parity to be added into the turbo stream.

The interleaver 230 interleaves the turbo stream received from the place holder maker 220. The TS multiplexer 240 multiplexes the normal stream and the turbo stream to construct a dual transport stream (TS). Then, the TS multiplexer 240 generates the broadcast packets by packetizing the constructed dual transport stream (TS). The TS multiplexer 240 includes a packet generator 241, a counter 243, and an information controller 245. The packet generator 241 forms the dual transport stream (TS) by combining the normal stream and the turbo stream, and the dual transport stream (TS) is packaged in the form of packets.

FIG. 3 illustrates the structure of an example dual transport stream (TS) according to an embodiment of the present invention. Hereinafter, the construction and operation of the multiplexer 240 will be explained with reference to FIG. 3.

Referring to FIG. 3, in the dual transport stream (TS), a turbo stream has 78 packets which is inserted into packets of 312 segments of one field of a dual transport stream. The dual transport stream (TS) is constructed so that four packets, which include one packet (188 bytes) of the turbo stream and three packets (188 bytes) of the normal stream, are repeatedly arranged in the ratio of 1:3. In the case that the turbo stream of 78 packets is inserted into 312 segments of the dual transport stream (TS), the dual transport stream (TS) is constructed so that four packets, which include one packet (188 bytes) of the turbo stream and three packets (188 bytes) of the normal stream (in the ratio of 1:3), are repeated for 78 times.

Referring back to FIG. 2, the counter 243 counts the number of dual transport stream (TS) packets formed by the packet generator 241, and outputs the result of counting.

The information controller 245, if the count result that is received from the counter 243 reaches a predetermined number of packets that constitute one frame according to the standard of the digital broadcasting system, adds packet start information to the packet when the count result reaches the predetermined number of packets, and transmits the packet with the packet start information added thereto. This packet with the packet start information added thereto is called a VFIP (VSB Frame Initialization Packet).

Specifically, referring to FIG. 3, the information controller 245 adds the packet start information to a header of the packet, which is composed of 3 bytes, and transmits the packet with the packet start information to the base stations (as shown, for example, in FIG. 1). In this case, it is preferable that the packet start information is added to a packet identifier (PID) region of the header. Here, the packet start information represents information indicating that the next packet of after the packet to which the packet start information has been added is the first packet of the next frame.

If the count result received from the counter 243 is not equal to the predetermined number of packets, the information controller 245 transmits the dual transport stream packet formed by the packet generator 241 as it is. That is, the information controller 245 does not add the packet start information to the packet, when the count result is not equal to the predetermined number of packets, and transmits the dual transport stream packet outputted from the packet generator 241 to the base stations (as shown, for example, in FIG. 1).

Figure 4:
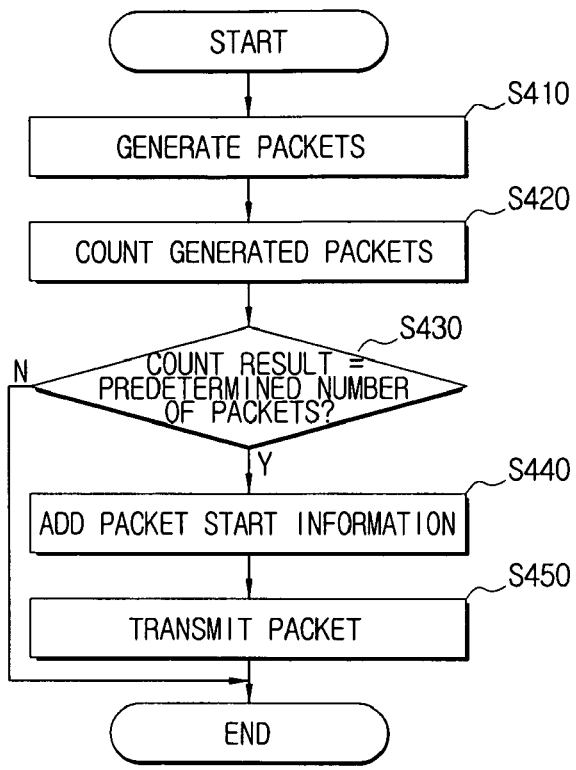
FIG. 4 is a flowchart of a method for operating a multiplexer according to an embodiment of the present invention.
Figure 5:
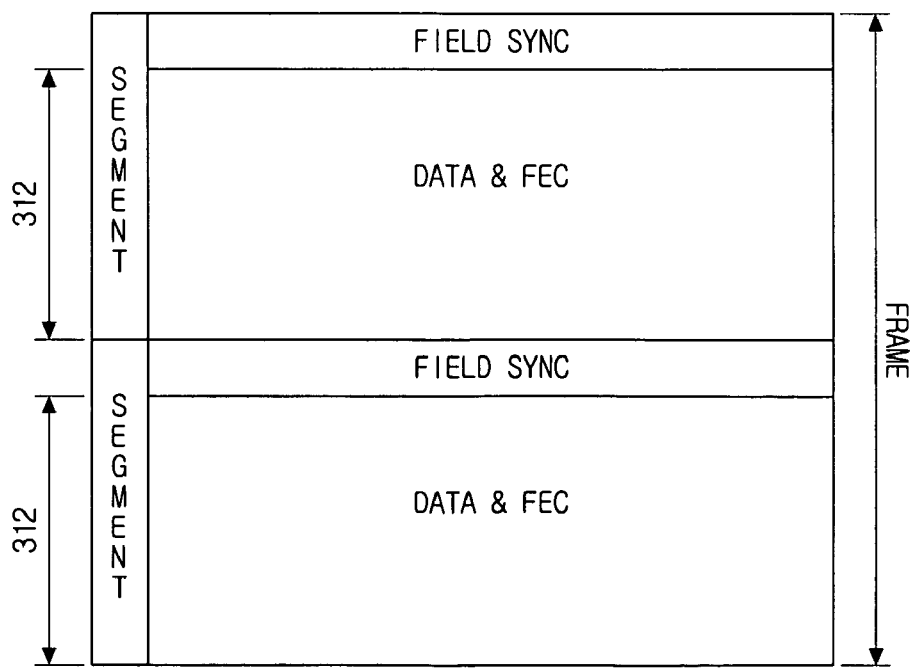
FIG. 5 illustrates an example data frame in accordance with an ATSC VSB type of a digital broadcasting system according to an embodiment of the present invention.

FIG. 4 is a flowchart provided to explain a method for operating a multiplexer according to an embodiment of the present invention, and FIG. 5 illustrates an example frame formed by an ATSC VSB type transmitter in a digital broadcasting system according to an embodiment of the present invention.

Referring to FIG. 4 and FIG. 5, the packet generator 241 included in the TS multiplexer 240 generates a dual transport stream (TS) by combining a normal stream and a turbo stream, and in this case, the dual transport stream (TS) is in the form of packets at operation S410. That is, the packet generator 241 generates the dual transport stream (TS) by multiplexing the input normal stream and turbo stream, and provides the dual transfer stream (TS) in the form of packets.

Then, the counter 243 counts the dual transfer stream packets, and outputs the count result at operation S420. Then, the information controller 245 determines whether the count result reaches a predetermined number of packets that constitute one frame according to the standard of the digital broadcasting system at operation S430.

If the count result reaches the predetermined number of packets, the information controller 245 adds packet start information to a header of the packet at operation S440. This packet to which the packet start information has been added is called the VFIP (VSB Frame Initialization Packet). Here, the packet start information represents information indicating that the next packet after the packet to which the packet start information has been added is the first packet of the next frame.

Specifically, as shown in FIG. 5, each frame of a packet is composed of two fields, and each field is composed of one field sync segment that is the first segment, and 312 data segments. In the case where the packet start information is set to be added every 20 frames, for example, the information controller 345 adds the packet start information to the header of the packet when the count result at operation S420 reaches a predetermined number, such as 12,480. Here, 12,480 represents the number of packets that corresponds to 20 frames except for the field sync segments.

That is, one frame except for the field sync segments is composed of 624 packets, and 20 frames are composed of 12,480 (=624*20) packets. The information controller 345 adds the packet start information, which indicates that the next packet (i.e., the 12,481st packet) is the start packet of the next frame, to the header of the last packet, i.e., the 12,480th packet, of the 20th frame. Then, the information controller 245 included in the TS multiplexer 240, as shown in FIG. 2, transmits the packet to the base stations (as shown, for example, in FIG. 1) at operation S450.

Specifically, if the count result reaches the predetermined number of packets, the information controller 245 transmits the VFIP that is the packet to which the packet start information has been added at operation S440 to the base stations. If the count result has not reached the predetermined number of packets, the information controller 245 included in the TS multiplexer 240 transmits the dual transport stream packet generated by the packet generator 241 as it is. That is, with respect to the packet in which the count result has not reached the predetermined number of packets, i.e., the packet that is not the VFIP, the information controller 245 included in the TS multiplexer 240 transmits the dual transport stream packet outputted at operation S410 to the base stations (as shown, for example, in FIG. 1).

On the other hand, in the TS multiplexer 240 according to an embodiment of the present invention, the information controller 245 for adding packet start information to a header of the packet, or for constructing a plurality of frames with the predetermined number of packets are only exemplary, and the present invention is not limited thereto. The packet information controller 245 adds packet start information to the packet depending on whether the count result is equal to the predetermined number of packets, irrespective of the frame unit or field unit. Also, in the TS multiplexer 240 according to the present invention, the packet start information that is added to the header of the packet is also applicable to a single transport stream packet.

Figure 6:
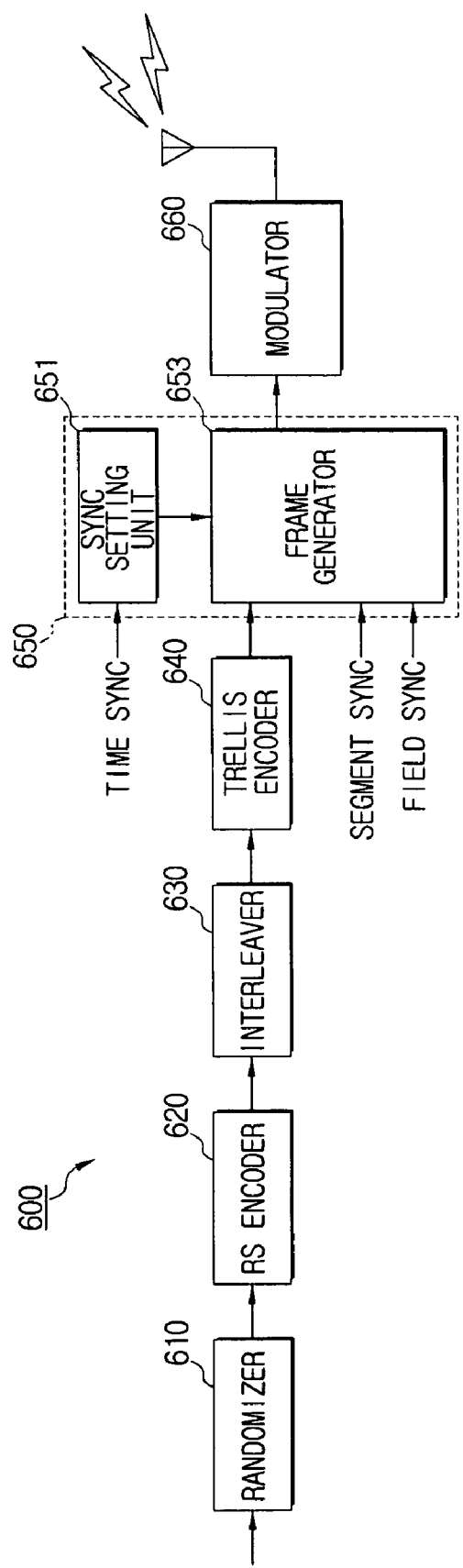
FIG. 6 is a block diagram illustrating the construction of an example digital broadcast transmitter according to an embodiment of the present invention.

Turning now to FIG. 6, the construction of an example digital broadcast transmitter according to an embodiment of the present invention is illustrated. Referring to FIG. 6, the digital broadcast transmitter 600 includes a randomizer 610, an RS encoder 620, an interleaver 630, a trellis encoder 640, a multiplexer 650, and a modulator 660. However, for purposes of simplicity and brevity, the RS encoder 620 and the interleaver 630 can be omitted, and the positions of the RS encoder 620 and the interleaver 630 can be changed.

The randomizer 610 randomizes the dual transport stream (TS). Here, the dual transport stream (TS) input to the randomizer 610 is obtained by multiplexing the normal stream and the turbo stream, and includes a parity region for adding the parity.

The RS encoder 620 adds the parity to the parity region included in the packet of the input dual transport stream (TS). The RS encoder 620 is in the form of a concatenated coder for adding the parity to the transport stream (TS) in order to correct an error that may occur due the channel characteristics in the course of packet transmission.

The interleaver 630 interleaves the dual transport stream (TS) input from the RS encoder 620. Here, the term "interleaving" does not mean the change of data, but means the position change of data in the data frame.

The trellis encoder 640 performs a trellis encoding of the dual transport stream (TS) interleaved by the interleaver 630, and stores the trellis-encoded dual transport stream (TS) in a packet buffer (not shown) for temporarily storing the received dual transport stream (TS).

The multiplexer 650 sets the clock synchronization of the TS construction unit 200 and the digital broadcast transmitter 600 equal to each other using a Global Positioning System (GPS), determines whether the received dual transport stream (TS) packet is the VFIP, and constructs a frame by adding the segment sync signal and the field sync signal to the dual transport stream (TS) on the basis of the result of such a determination. The multiplexer 650 includes a sync setting unit 651 and a frame generator 653.

The sync setting unit 651 uses the GPS to set the clock synchronization of the TS construction unit 200 and the digital broadcast transmitter 600.

Specifically, during the transmission/reception of a dual transport stream (TS), the sync setting unit 651 receives a time sync signal of predetermined bits through an artificial satellite, and sets the clock synchronization of the TS multiplexer 240 of the TS construction unit 200, as shown in FIG. 2, and the multiplexer 650 of the digital broadcast transmitter 600, as shown in FIG. 6, based on the time sync signal.

The frame generator 653, if the clock synchronization is set by the sync setting unit 651, determines whether the received dual transport stream (TS) packet is the VFIP, and outputs the result of such a determination. Here, the VFIP is a packet to which the packet start information is added, and indicates that the next packet is the first packet of the next frame.

Specifically, the frame generator 653 discards the received dual transport stream (TS) packet if the received packet is not the VFIP, while generating a frame by gathering the predetermined number of packets that are received after the VFIP if the received packet is the VFIP. In this case, the frame generator 653 determines whether the received packet is the VFIP by detecting the existence/nonexistence of the packet start information added to the header of the received packet.

Also, the frame generator 653 constructs a frame by grouping the predetermined number of packets after the VFIP until the packet that is the next VFIP is received. In this case, if the VFIP is received after the initial VFIP, the frame generator 653 uses the received VFIP as a verification packet, and regenerates a frame by gathering the predetermined number of packets received after the verification packet.

The modulator 660 performs a channel modulation of the dual transport stream (TS) multiplexed by the multiplexer 650, and converts the modulated transport stream (TS) into an RF channel band signal to transmit the converted RF channel band signal, via a transmission channel.

Figure 7:
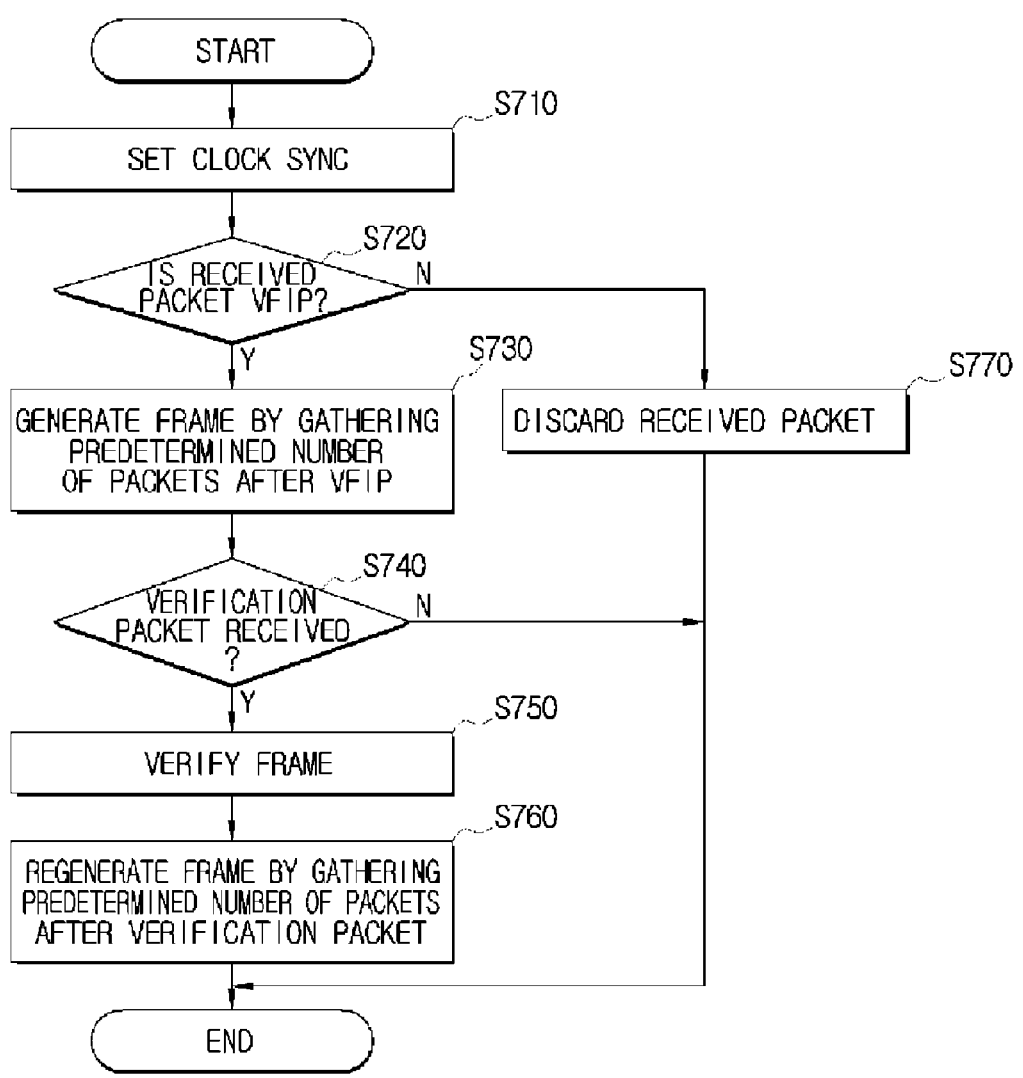
FIG. 7 is a flowchart of a method for operating a digital broadcast transmitter according to an embodiment of the present invention.

FIG. 7 is a flowchart explaining a method for operating a digital broadcast transmitter according to an embodiment of the present invention. Referring to FIG. 7, the sync setting unit 651 sets the clock synchronization of the TS construction unit 200, as shown in FIG. 2, and the digital broadcast transmitter 600, as shown in FIG. 6, using the GPS at operation S710.

Specifically, during the transmission/reception of a dual transport stream, the sync setting unit 651 receives a time sync signal of predetermined bits through an artificial satellite, and sets the clock synchronization of the TS multiplexer 240 of the TS construction unit 200, as shown in FIG. 2, and the multiplexer 650 of the digital broadcast transmitter 600, as shown in FIG. 6, based on the time sync signal.

The frame generator 653, if the clock synchronization is set, determines whether the received dual transport stream (TS) is the VFIP at operation S720. Here, the VFIP is a packet to which the packet start information is added, and indicates that the next packet is the first packet of the next frame.

Specifically, the frame generator 653 determines whether the received dual transport stream (TS) packet is the VFIP by detecting the existence/nonexistence of the packet start information added to the header of the received packet. That is, the frame generator 653 determines the received packet as the VFIP if the packet start information has been added to the header of the received packet, while determining the received packet as a packet that is not the VFIP if the packet start information has not been added to the header of the received packet.

If the received packet is the VFIP, the frame generator 653 generates a frame by gathering the predetermined number of packets, starting from the first packet received after the VFIP at operation S730. In this case, it is preferable that one frame is composed of 624 packets except for the field sync segments. The frame generator 653 generates a frame by grouping 624 packets received after the VFIP, and then generates a frame by grouping 624 packets in succession. Here, it is exemplified that the number of packets constituting one frame is set to 624. However, this is only an exemplary, and the present invention is not limited thereto.

Then, the frame generator 653 determines whether a verification packet is received at operation S740. Here, the verification packet is a VFIP received by the frame generator 653 after the first VFIP is received. If the verification packet is received, the frame generator 653 verifies the frame by checking the number of packets that have been gathered to generate the frame at operation S750. For example, if the frame is composed of 624 packets, the frame generator 653 checks if 624 packets including the verification packet have been gathered. If 624 packets have been gathered, the frame generator 653 determines that the frames are properly constructed, and continuously generates the frames.

If 624 packets have not been gathered, the frame generator 653 discards all the packets that have been gathered for the frame generation, and regenerates a frame by gathering 624 packets received after the verification packet at operation S760.

Finally, if the received packet is not the VFIP at operation S720, the frame generator 653 discards the received packet at operation S770.

On the other hand, in the digital broadcast transmitter and the signal processing method thereof, it is also applicable to a single transport stream packet to generate a frame by determining whether the received packet is the VFIP packet to which the packet start information is added.

As described above, according to the present invention, frequency resources can be conserved and waste can be eliminated, if not reduced, by adding packet start information to a packet to be transmitted in a transmitter, and by extracting and processing the packet start information from the received packet in a receiver. In addition, a user's convenience can be enhanced by receiving the same broadcast signal through the same channel number for each locality.

Various components of the digital broadcasting system, as shown in FIG. 2 and FIG. 6, can be implemented in hardware, such as, for example, an application specific integrated circuit (ASIC); however, where appropriate, software, hardware, or a combination thereof can be utilized. In particular, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. An apparatus for generating a transport stream, comprising:
    a packet generator to generate a plurality of packets;
    a counter to count the number of packets generated and provide a count value; and
    a controller to determine whether the count value has reached a predetermined number of packets, to insert packet start information related to an order of the packets into a header of one of the packets when the count value has reached the predetermined number of packets, and to transmit the packets including the packet having the packet start information inserted therein in a transport stream,
    wherein the packet start information indicates that a next packet is a start packet of a frame.

2. The apparatus as claimed in claim 1, wherein the frame including the start packet indicated by the packet start information is a first frame in a unit of frames.

3. The apparatus as claimed in claim 1, wherein the packet start information is inserted into one of the packets that is arranged just before the start packet.

4. The apparatus as claimed in claim 3, wherein the packet start information is inserted into a header of the packet arranged just before the start packet.

5. The apparatus as claimed in claim 3, wherein the packet start information is inserted into a packet identifier (PID) of the packet arranged just before the start packet.

6. The apparatus as claimed in claim 1, wherein the packet generator generates the transport stream comprising the packets by compressing video and audio signals.

7. The apparatus as claimed in claim 6, wherein the transport stream is either a dual transport stream comprising a normal data stream and a turbo data stream, or a single transport stream.

8. A data processing method for a transport stream generation apparatus, comprising:
    generating a plurality of packets by compressing video and audio signals;
    counting the number of packets generated and providing a count value;
    determining whether the count value has reached a predetermined number of packets;
    inserting packet start information related to an order of the packets into a header of one of the packets when the count value has reached the predetermined number of packets; and
    transmitting the packets including the packet having the packet start information inserted therein in a transport stream via a transmission channel,
    wherein the packet start information indicates that a next packet is a start packet of a frame.

9. The data processing method as claimed in claim 8, wherein the frame including the start packet indicated by the packet start information is a first frame in a unit of frames.

10. The data processing method as claimed in claim 8, wherein the packet start information is inserted into one of the packets that is arranged just before the start packet.

11. The data processing method as claimed in claim 10, wherein the packet start information is inserted into a header of the packet arranged just before the start packet.

12. The data processing method as claimed in claim 10, wherein the packet start information is inserted into a packet identifier (PID) region of the packet arranged just before the start packet.

13. A digital broadcast transmission apparatus, comprising:
    a sync setting unit to set a clock synchronization for transmission of a transport stream in the form of packets; and
    a frame generator to determine whether packet start information that indicates that a next packet is a start packet of a frame has been inserted into one packet among a plurality of packets that have been received, and to generate a frame based on a result of the determination,
    wherein the frame generator uses one of the packets into which the packet start information has been inserted that was received after a first time one of the packets into which the packet start information is received as a verification packet, and
    wherein when the verification packet is received, the frame generator discards all gathered packets and regenerates a frame by gathering a predetermined number of packets received after the verification packet is received, if a number of the gathered packets including the verification packet is smaller than the predetermined number of packets.

14. The digital broadcast transmission apparatus as claimed in claim 13, wherein:
    the sync setting unit sets the clock synchronization to be synchronized with an apparatus that has transmitted the transport stream in the form of packets based on a time sync signal received from a satellite using a Global Positioning System (GPS) receiver; and the frame generator, after the clock synchronization has been set, determines whether the packet start information has been inserted into a header of a received packet, and generates the frame based on a result of the determination.

15. The digital broadcast transmission apparatus as claimed in claim 13, wherein if the frame generator determines that the packet start information has been inserted into the header of the received packet, the frame generator constructs the frame by gathering a predetermined number of packets received after the packet into which the packet start information has been inserted is received.

16. A data processing method for a digital broadcast transmission apparatus, comprising:

setting a clock synchronization for transmission of a transport stream in the form of packets;

determining whether packet start information that indicates that a next packet is a start packet of a frame has been inserted into one packet among a plurality of packets that have been received;

generating a frame based on a result of the determination performed after the clock synchronization has been set;

using one of the packets into which the packet start information has been inserted that was received after a first time one of the packets into which the packet start information is received as a verification packet; and when the verification packet is received, discarding all gathered packets and regenerating a frame by gathering a predetermined number of packets received after the verification packet was received, if a number of the gathered packets including the verification packet is smaller than the predetermined number of packets.

17. The data processing method as claimed in claim 16, wherein:

the setting comprises setting the clock synchronization to be synchronized with an apparatus that has transmitted the transport stream in the form of packets based on a time sync signal received from a satellite using a Global Positioning System (GPS) receiver;

the determining comprises determining, after the clock synchronization has been set, whether the packet start information has been inserted into a header of a received packet; and the generating comprises generating the frame based on a result of the determination performed after the clock synchronization has been set.

18. The data processing method as claimed in claim 16, wherein the generating comprises, if a result of the determination is that the packet start information has been inserted into the header of the received packet, constructing the frame by gathering a predetermined number of packets received after the packet into which the packet start information has been inserted is received.

19. A digital broadcasting system, comprising:

a multiplexer to generate a plurality of packets by compressing video and audio signals, and to generate packet start information related to an order of the packets; and a digital broadcast transmitter to receive the packets and the packet start information related to the order of the packets from the multiplexer, and to process the packets according to the packet start information related to the order of the packets and indicates that a next packet is a start packet of a frame, wherein the digital broadcast transmitter uses one of the packets into which the packet start information has been inserted that was received after a first time one of the packets into which the packet start information is received as a verification packet, and wherein when the verification packet is received, the digital broadcast transmitter discards all gathered packets and regenerates a frame by gathering a predetermined number of packets received after the verification packet is received, if a number of the gathered packets including the verification packet is smaller than the predetermined number of packets.

20. The digital broadcasting system as claimed in claim 19, wherein the multiplexer and the digital broadcast transmitter are synchronized with the same clock signal.

21. The digital broadcasting system as claimed in claim 19, wherein the multiplexer and the digital broadcast transmitter are synchronized with a clock signal obtained from a Global Positioning System (GPS) receiver.

22. A data processing method for a digital broadcasting system, comprising:

generating a plurality of packets by compressing video and audio signals;

generating packet start information related to an order of the packets;

transmitting the packets and the packet start information related to the order of the packets and indicates that a next packet is a start packet of a frame;

receiving, by a digital broadcast transmitter, the transmitted packets and the transmitted packet start information;

using one of the received packets into which the packet start information has been inserted that was received after a first time one of the packets into which the packet start information is received as a verification packet; and when the verification packet is received, discarding all gathered packets and regenerating a frame by gathering a predetermined number of packets received after the verification packet is received, if a number of the gathered packets including the verification packet is smaller than the predetermined number of packets.

23. The data processing method as claimed in claim 22, wherein the packet start information indicates a start packet of a frame formed by gathering a predetermined number of the packets.

24. The data processing method as claimed in claim 23, wherein:

the frame including the start packet indicated by the packet start information is a first frame in a unit of a plurality of frames; and the method further comprises inserting the packet start information into one of the packets that is arranged just before the start packet.

* * * * *